(12) United States Patent
Lange et al.

(10) Patent No.: US 8,334,626 B2
(45) Date of Patent: Dec. 18, 2012

(54) ADAPTIVE COOLING UNIT FOR A POWER TOOL

(75) Inventors: Michael Lange, Winnenden (DE); Rainer Vogler, Leutenbach (DE)

(73) Assignee: AEG Electric Tools GmbH, Winnenden (DE)

( * ) Notice: Subject to any disclaimer, the term of this patent is extended or adjusted under 35 U.S.C. 154(b) by 279 days.

(21) Appl. No.: 12/578,188

(22) Filed: Oct. 13, 2009

(65) Prior Publication Data

US 2010/0102654 A1    Apr. 29, 2010

(30) Foreign Application Priority Data

Oct. 13, 2008   (DE) .......................... 10 2008 042 776

(51) Int. Cl.
*H02K 9/04* (2006.01)
*H02K 9/06* (2006.01)

(52) U.S. Cl. .......... 310/75 R; 310/47; 310/68 C; 310/78

(58) Field of Classification Search .................... 310/47, 310/58–63, 68 B, 75 R, 92, 75 D, 77, 78, 310/68 C; 192/82 T; 415/122.1, 123
See application file for complete search history.

(56) References Cited

U.S. PATENT DOCUMENTS

| 3,829,721 | A | * | 8/1974 | Rosenthal, Jr. ................. 310/47 |
| 4,074,662 | A | * | 2/1978 | Estes ........................... 123/41.12 |
| 4,238,016 | A | * | 12/1980 | Yoshida et al. .............. 192/58.5 |
| 4,868,437 | A | * | 9/1989 | Wagner et al. ................... 310/78 |
| 5,749,704 | A | * | 5/1998 | Jerdee ........................ 415/211.2 |
| 7,166,939 | B2 | * | 1/2007 | Voigt et al. ..................... 310/47 |
| 2006/0096554 | A1 | | 5/2006 | Shiozaki |
| 2006/0290213 | A1 | * | 12/2006 | Furui et al. ...................... 310/58 |

FOREIGN PATENT DOCUMENTS

| CH | 193 146 | 12/1937 |
| DE | 3430023 | 2/1986 |

\* cited by examiner

*Primary Examiner* — Tran Nguyen

(74) *Attorney, Agent, or Firm* — Knobbe Martens Olson & Bear LLP

(57) ABSTRACT

A cooling unit for a power tool comprises a fan wheel (10) to be supported on an armature shaft (3) of a motor (1) of the power tool. The cooling unit comprises a torque transfer means as well as an actuating means (20, 22) for actuating this torque transfer means so as to selectively transfer the rotation of the armature shaft (3) to the fan wheel (10) during operation of the power tool.

10 Claims, 3 Drawing Sheets

ADAPTIVE COOLING UNIT FOR A POWER TOOL

FIELD OF THE INVENTION

The present invention concerns an adaptive cooling unit for a power tool as well as a power tool having such an adaptive cooling unit.

PRIOR ART

The durability and operational readiness of the motor of power tools such as portable drills, hammer drills, thread cutters, power screwdrivers, grinders or the like crucially depend on motor temperature. Too high a motor temperature may have the result that the power tool cannot be operated for a certain time during which the motor has to cool down. Therefore, during operation, the temperature of the motor should not exceed a certain value.

Hence, power tools usually have an incorporated fan that serves for cooling the motor and possible further components of the power tool, for example the transmission and various electronic components.

The motor temperature increases all the more the higher is the load torque to be applied by the motor. In contrast, the temperature drops if the motor is in no-load operation.

In known devices, the fan is supported on the armature shaft of the motor, the fan and the armature shaft being fixedly connected to each other. The fan always runs along with the armature shaft and rotates at the same rotational speed as the armature shaft. Thus, the fan has its strongest cooling action in no-load operation although in no-load operation the least heat has to be dissipated. This leads to unnecessary losses which in rechargeable battery-driven devices is also noticeable in shortened battery life.

SUMMARY OF THE INVENTION

The present invention has the object to provide a cooling unit for a power tool as well as a corresponding power tool, by means of which the efficiency of the power tool can be increased and, thus, energy can be saved.

This object is obtained by a cooling unit and a power tool.

Accordingly, the cooling unit comprises a fan wheel to be supported on an armature shaft of a motor of the power tool and, according to the invention, a torque transfer means as well as an actuating means in order to selectively transfer the rotation of the armature shaft to the fan wheel during operation of the power tool.

In this manner, the fan wheel is only rotated as needed in order to cool the motor. By means of this targeted operative addition of the fan wheel according to need the efficiency of the power tool can be increased. Unnecessary operation of the fan wheel at small loads and, in particular, in no-load conditions may be avoided.

Preferred optional features are described in the dependent claims.

Preferably, the torque transfer means comprises a coupling member coupleable with the armature shaft and the fan wheel in order to transfer the rotation of the armature shaft onto the fan wheel.

This coupling member may be coupleable to the armature shaft and/or the fan wheel via at least one force-fit (friction-locked) connection; hence, the coupling member may also be a friction wheel, for example. The coupling member may, however, also form form-fit connections with the armature shaft and/or the fan wheel, for example in form of a gear.

The torque transfer means may, moreover, comprise transmission members, one of which is connected with the fan wheel and another of which is connected to the armature shaft in a rotatably fixed manner, and which may be brought into engagement with the coupling member in order to transmit the rotation of the armature shaft onto the fan wheel.

Here, the actuating means may actuate the torque transfer means based upon the temperature of the motor. Upon reaching a certain motor temperature, the actuating means actuates the torque transfer means in order to transfer the rotation of the armature shaft onto the fan wheel.

In this case, the actuating means may comprise a heat-sensitive component, in particular a bi-metal strip. A bi-metal strip is a metal strip consisting of two layers of different materials that are joined integrally or by form-fit. Due to the different thermal expansion coefficients of the two metals the strip bends upon heating as both strips extend to a different degree. Possible combinations of metals are zinc and steel or brass and steel, for example. Both strips are rolled upon each other under pressure, for example, with an inseparable joint being formed in the contact area by cold welding. Alternatively, the metal strips may be riveted or screwed together. The use of bi-metal strips has the advantage that the actuator does not spend any energy for actuating the torque transfer means.

Alternatively, the actuating means may actuate the torque transfer means in any other way, such as by means of a solenoid. In this case, the motor temperature would be detected by means of a temperature sensor, and the solenoid would be driven correspondingly.

The actuating means may actuate the torque transfer means also as a function of the rotational speed and/or the torque instead of based on the motor temperature. Under load, the rotational speed of the power tool decreases so that in this case the torque transfer means would be actuated as soon as the rotational speed has decreased to a certain threshold, or else as soon as the load torque reaches a certain threshold.

Finally, it is advantageous that the torque transfer means comprises a transmission so that the fan wheel rotates at a higher speed than the armature shaft. Due to the increased air throughput the cooling effect is improved at high rotational speeds. Consequently, in this case a sufficient cooling performance may already be reached with a smaller and more compact fan wheel.

DETAILED DESCRIPTION OF A PREFERRED EMBODIMENT

FIGS. 1 to 4 show, as preferred embodiment of the invention, an electrical power drill having a cooling unit according to the invention.

Figure 1:
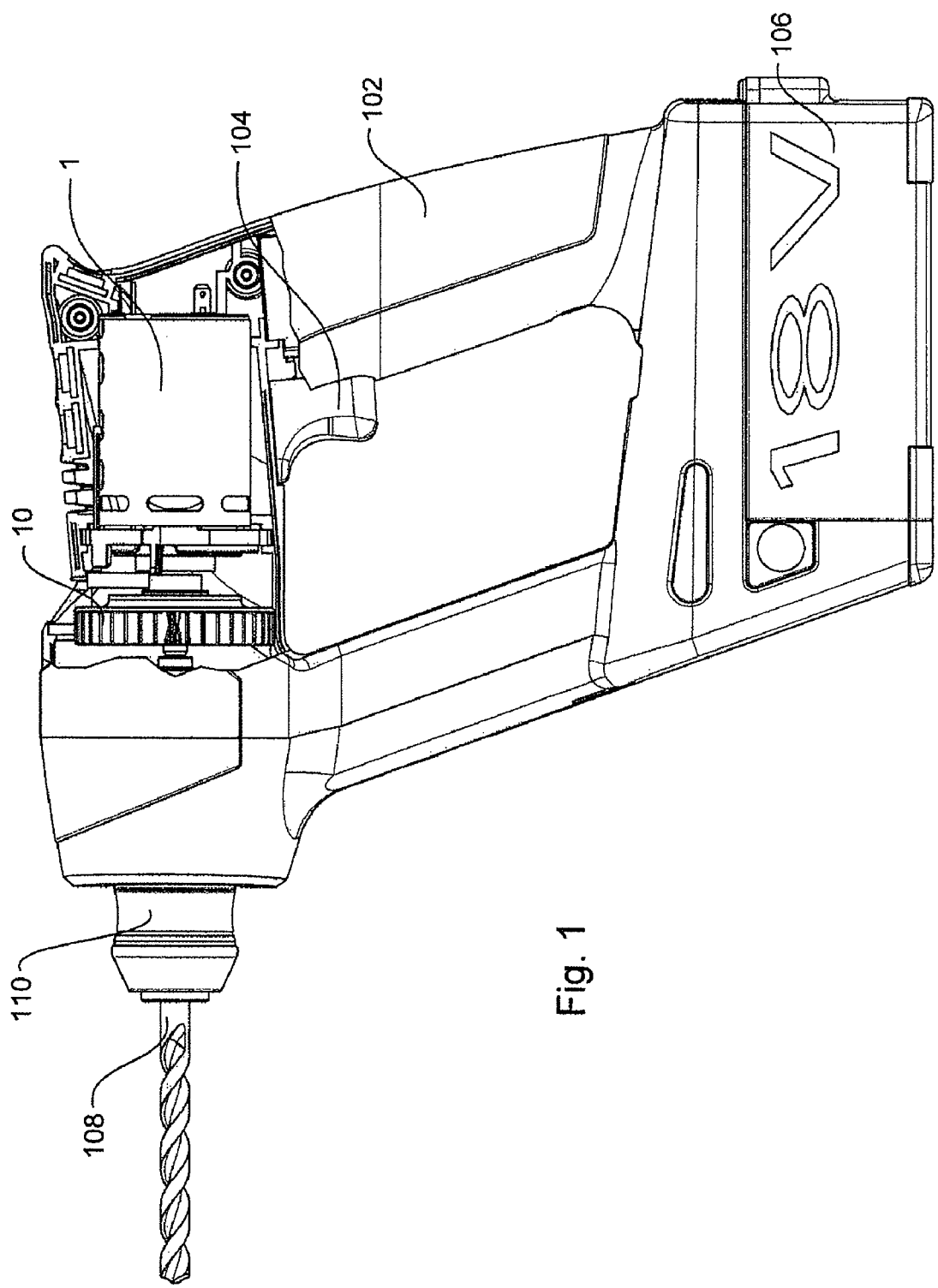
FIG. 1 shows a side view of a power tool having a cooling unit according to the invention.

As can be seen from FIG. 1, the power drill as such is configured in a known manner and comprises a housing having a handle 102, an operating switch 104 and a battery pack 106. In the housing there is a motor 1 for driving a drill tool 108 held in a tool fitting 110. To that end, a gear not shown in more detail is provided in a conventional manner between a shaft of the motor 1 and the drill tool 108.

Figure 2:
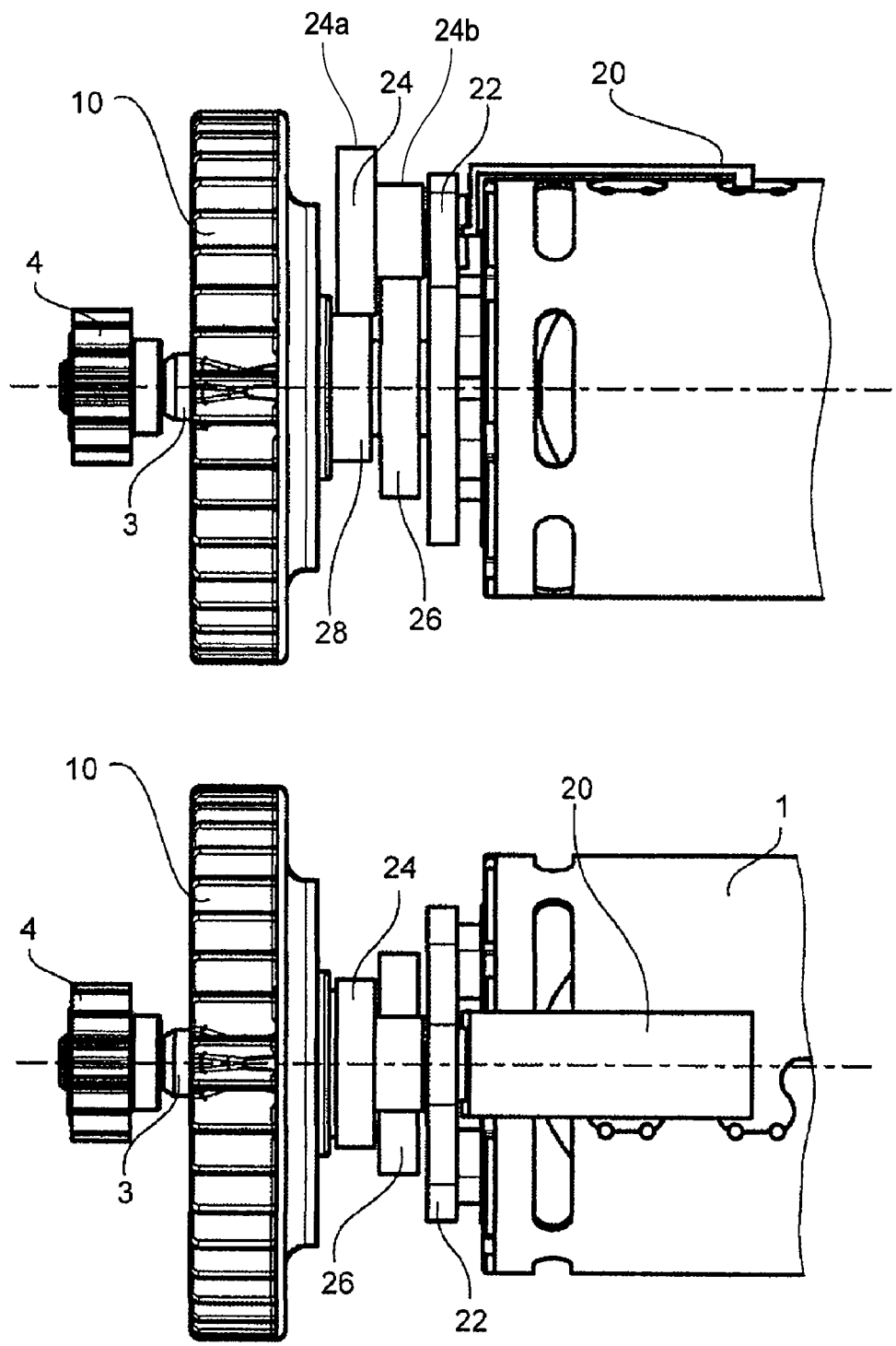
FIG. 2 shows the cooling unit according to the invention in a side view and in a top view.
Figure 3:
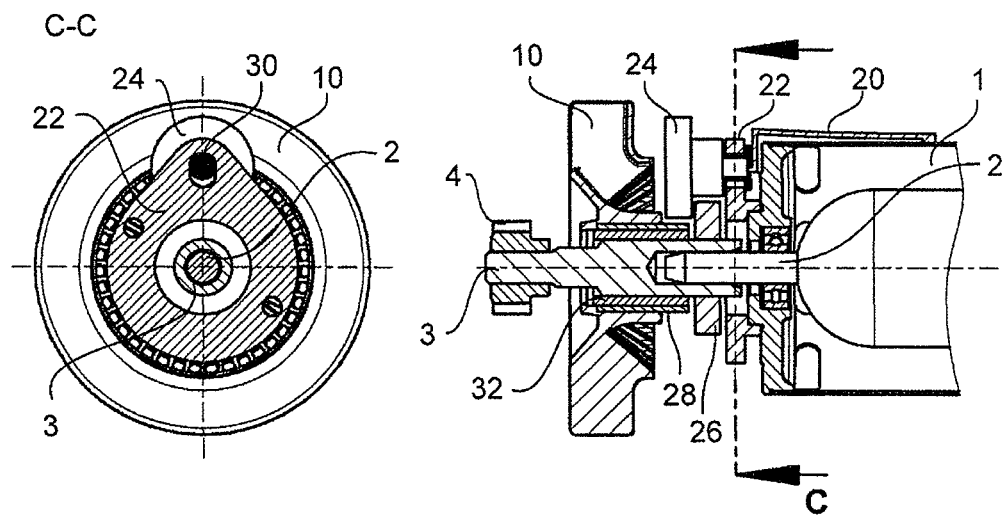
FIG. 3 shows sectional views of the cooling unit according to the invention in its idle state.
Figure 4:
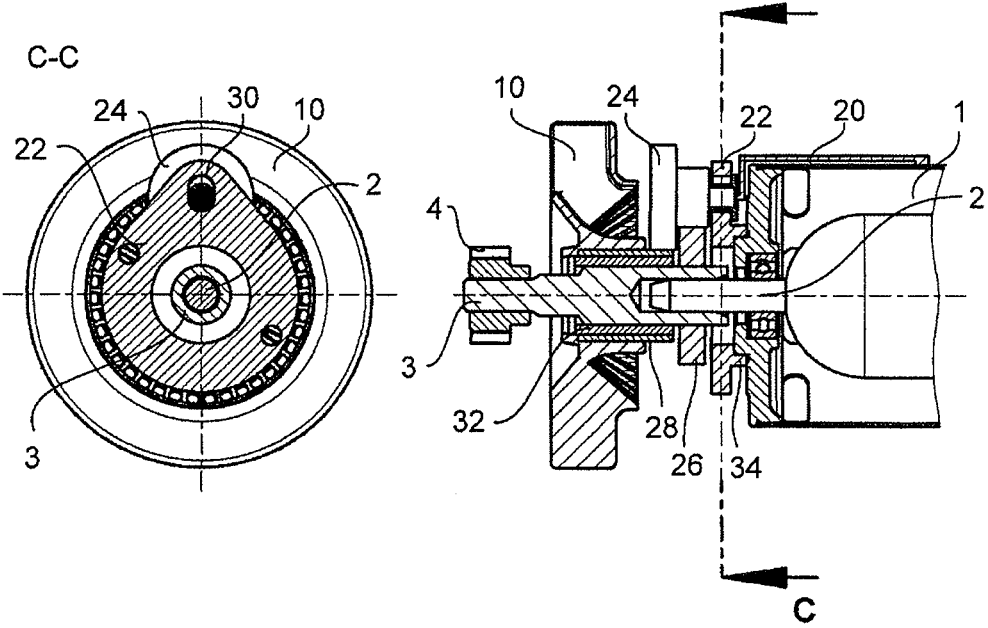
FIG. 4 shows sectional views of the cooling unit according to the invention in its operative state.

Moreover, a cooling unit having a fan wheel 10 and described in the following in more detail by reference to FIGS. 2 to 4, is arranged in the housing for cooling the engine 1.

The fan wheel 10 is floatingly supported on an armature shaft 3 of the power drill by means of a floating bearing having an inner ring 32 and an outer ring 28. On its part, the armature shaft 3 is connected to the motor shaft 2 and rotates along with it. At the free end of the armature shaft 3 there is a pinion 4 for connection to said gear for driving the drill 108.

In order to selectively transfer the rotation of the armature shaft 3 to the fan wheel 10 during operation of the power tool, a torque transfer means is provided. In the present embodiment, this torque transfer means substantially consists of a coupling wheel 24 as coupling member as well as the outer ring 28 of the floating bearing and a friction wheel 26 that is directly mounted on the armature shaft 3 and always rotates along with it, as transmission members. The outer ring 28 of the floating bearing is connected to the fan wheel 10 in a rotationally fixed manner.

The coupling wheel 24 is held on the housing of the motor 1 by means of a support plate 22, and in such a manner that it may move up and down by certain amount. As can be seen from FIGS. 3 and 4, the coupling wheel 24 is configured in three stages; it has an axle journal extending through a slot 30 formed in the support plate 22, and an adjacent central portion having a larger diameter than the axle journal and an outer portion having a still larger diameter.

The support plate 22 itself comprises a circumferential flange 34 by means of which it is attached to a corresponding protrusion on the housing of the motor 1.

A bi-metal strip 20 is fixed at its first end to the housing of the motor 1 and at its second end to an axis of the coupling wheel 24.

In the idle position shown in FIG. 3, the coupling wheel 24 is distanced from the outer ring 28 of the floating bearing of the fan wheel 10 and from the friction wheel 26 mounted on the armature shaft 3. Thus, the rotation of the armature shaft 3 is not transmitted to the fan wheel 10 and no energy is spent to rotate the fan wheel 10 together with the armature shaft 3. This idle position of the cooling unit is adopted as long as the motor temperature does not exceed an upper threshold and no cooling of the motor 1 is necessary.

If, under larger load, the motor 1 and hence also the bi-metal strip 20 heat up, this bi-metal strip 20 will bend and in doing so move the coupling wheel 24 downward into the operative position of the cooling unit shown in FIG. 4. The central portion of the coupling wheel 24 is pressed against the friction wheel 26 and its outer portion is pressed against the outer ring 28 so that the coupling wheel 24 rolls off the friction wheel 6 and the outer ring 28. In this way, the rotation of the armature shaft 3 is transmitted via the friction wheel 26, the coupling wheel 24 and the outer ring 28 to the fan wheel 10 so that the fan wheel 10 is rotated and the motor 1 is cooled.

The fan wheel 10 is driven to rotate until the motor 1 and the bi-metal strip 20 have cooled to a temperature at which the bi-metal strip 20 again adopts the non-operative position shown in FIG. 3 and separates the coupling wheel 24 from the friction wheel 26 and the outer ring 28.

The speed of rotation of the fan wheel 10 may be influenced by suitable dimensioning of the central and outer portions of the coupling wheel 24. Preferably, these are dimensioned so that the fan wheel 10 rotates faster than the armature shaft 3. In this case a sufficient cooling performance may already be achieved with a smaller fan wheel 10. As depicted in FIG. 2, coupling wheel 24 can comprise a first portion 24a and a second portion 24b. In the illustrated arrangement, the first portion 24a has a first dimension and the second portion 24b has a second dimension, wherein the first dimension is greater than the second dimension.

The described embodiment of the invention may be modified within the framework of the enclosed claims, for example as follows.

In order to bring the coupling wheel 24 into engagement with the friction wheel 26 and the outer ring 28, any other per se known actuator may be utilized instead of the bi-metal strip. For example, a solenoid may be provided which, when a given temperature of the motor 1 is reached, brings into engagement the coupling wheel 24 with the friction wheel 26 and the outer ring 28. In this case, however, a separate temperature sensor would have to be provided.

Instead of the temperature other parameters, such as the load torque of the power drill, may also form the basis for actuating the torque transfer means: upon reaching a certain load torque the rotation of the armature shaft is transferred to the fan wheel; in the idle state, the fan wheel is, however, decoupled from the armature shaft. An RPM dependent control is also possible.

In principle, the actuator might even be configured so that the torque transfer means may be switched on and off by the operator of the power drill himself.

In the present embodiment, force-fit connections are formed between the coupling wheel 24 and the outer ring 28, on the one hand, and between the coupling wheel 24 and the friction wheel 26, on the other hand; alternatively, form-fit connections are conceivable, in particular by means of gearing (toothing).

Finally, as an enhancement it might be conceivable to couple the fan wheel 10 to the armature shaft 3 via several speed steps in order to adapt the fan performance to the cooling need.

The invention claimed is:

1. A power tool having a cooling unit, the cooling unit comprising a fan wheel supported on an armature shaft of a motor of the power tool, wherein the fan wheel is rotatable separately from the armature shaft;

wherein the cooling unit comprises:
a torque transfer arrangement that is selectively coupleable with the armature shaft and with the fan wheel, and that is displaceable between a first position wherein the torque transfer arrangement does not couple the armature shaft and the fan wheel and a second position wherein the torque transfer arrangement operably couples the armature shaft and the fan wheel; and
an actuator that moves the torque transfer arrangement between the first position and the second position so as to selectively transfer the rotation of the armature shaft to the fan wheel to respectively achieve, during operation of the power tool, a first mode wherein the fan wheel is not driven along with rotation of the armature shaft and a second mode wherein the fan wheel is driven along with rotation of the armature shaft;
wherein the actuator comprises a responsive element that responds to a motor parameter comprising one of: a motor temperature and a motor load, and moves the torque transfer arrangement from the first position to the second position in response to a change of the motor parameter.

2. The cooling unit according to claim 1, wherein the torque transfer arrangement comprises a coupling member coupleable with the armature shaft and the fan wheel so as to transfer the rotation of the armature shaft to the fan wheel.

3. The cooling unit according to claim 2, wherein the coupling member is coupleable to the armature shaft or the fan wheel via a force-fit connection.

4. The cooling unit according to claim 2, wherein the coupling member is coupleable to the armature shaft or the fan wheel via a form-fit connection.

5. A power tool having a cooling unit, the cooling unit comprising a fan wheel supported on an armature shaft of a motor of the power tool, wherein the fan wheel is rotatable separately from the armature shaft;
wherein the cooling unit comprises:
a torque transfer arrangement that is displaceable between a first position wherein the torque transfer arrangement does not couple the armature shaft and the fan wheel and a second position, wherein the torque transfer arrangement operably couples the armature shaft and the fan wheel, and wherein the torque transfer arrangement comprises:
a coupling member selectively coupleable with the armature shaft and the fan wheel so as to transfer the rotation of the armature shaft to the fan wheel; and
transmission members, wherein one of the transmission members is connected to the fan wheel in a rotatably fixed manner and the other of the transmission members is connected to the armature shaft in a rotatably fixed manner and wherein the transmission members are engageable with the coupling member so as to transmit the rotation of the armature shaft to the fan wheel; and
an actuator that moves the torque transfer arrangement between the first position and the second position so as to selectively transfer the rotation of the armature shaft to the fan wheel to respectively achieve, during operation of the power tool, a first wherein the fan wheel is not driven along with rotation of the armature shaft and a second mode wherein the fan wheel is driven along with rotation of the armature shaft;
wherein the actuator comprises a responsive element that responds to a motor parameter comprising one of: a motor temperature and a motor load, and moves the torque transfer arrangement from the first position to the second position in response to a change of the motor parameter.

6. The cooling unit according to claim 1, wherein the actuator comprises a heat-sensitive component.

7. The cooling unit according to claim 1, wherein the actuator is configured to actuate the torque transfer arrangement depending on rotary speed or torque.

8. The cooling unit according to claim 1, wherein the actuator comprises a solenoid.

9. A power tool having a cooling unit, the cooling unit comprising a fan wheel supported on an armature shaft of a motor of the power tool, wherein the fan wheel is rotatable separately from the armature shaft;
wherein the cooling unit comprises:
a torque transfer arrangement that is displaceable between a first position wherein the torque transfer arrangement does not couple the armature shaft and the fan wheel and a second position wherein the torque transfer arrangement operably couples the armature shaft and the fan wheel, wherein the torque transfer arrangement comprises a transmission that is dimensioned so that the fan wheel rotates with a higher speed than the armature shaft; and
an actuator that moves the torque transfer arrangement between the first position and the second position so as to selectively transfer the rotation of the armature shaft to the fan wheel to respectively achieve, during operation of the power tool, a first mode wherein the fan wheel is not driven along with rotation of the armature shaft and a second mode wherein the fan wheel is driven along with rotation of the armature shaft;
wherein the actuator comprises a responsive element that responds to a motor parameter comprising one of: a motor temperature and a motor load, and moves the torque transfer arrangement from the first position to the second position in response to a change of the motor parameter.

10. A power tool configured to provide selective cooling of the power tool comprising:
a motor that drives a rotatable armature shaft;
a rotatable fan wheel co-axially located on the armature shaft, wherein the fan wheel is rotatable separately from the armature shaft; and
a torque transfer arrangement configured to selectively transfer torque from the armature shaft to the fan wheel to achieve, during operation of the power tool, a first mode wherein the fan wheel is not driven along with rotation of the armature shaft and a second mode wherein the fan wheel is driven along with rotation of the armature shaft, the torque transfer arrangement comprising:
a coupling arrangement that selectively couples the armature shaft and the fan wheel and that is radially displaceable relative to the shared axis of the armature shaft and the fan wheel between a first position wherein the coupling arrangement does not couple the armature shaft and the fan wheel and a second position wherein the coupling arrangement operably couples the armature shaft and the fan wheel; and
a lifting arm comprising a temperature responsive element, wherein the lifting arm is configured to radially displace the coupling arrangement in response to a change of motor temperature.

* * * * *